US011177998B2

(12) United States Patent
Mirza et al.

(10) Patent No.: US 11,177,998 B2
(45) Date of Patent: Nov. 16, 2021

(54) CROSS DOMAIN TOPOLOGY FROM MACHINE LEARNING

(71) Applicant: International Business Machines Corporation, Armonk, NY (US)

(72) Inventors: Yusuf Mirza, Dubai (AE); Stephen A. Laufer, Saint Louis, MO (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 16/582,432

(22) Filed: Sep. 25, 2019

(65) Prior Publication Data
US 2021/0091999 A1    Mar. 25, 2021

(51) Int. Cl.
*H04L 12/24*    (2006.01)
*G06N 20/00*    (2019.01)
*G06N 7/00*    (2006.01)

(52) U.S. Cl.
CPC ......... *H04L 41/0618* (2013.01); *G06N 7/005* (2013.01); *G06N 20/00* (2019.01); *H04L 41/0622* (2013.01); *H04L 41/12* (2013.01); *H04L 41/16* (2013.01)

(58) Field of Classification Search
CPC . H04L 41/0618; H04L 41/0622; H04L 41/12; H04L 41/16; G06N 20/00; G06N 7/005
See application file for complete search history.

(56) References Cited

U.S. PATENT DOCUMENTS

| 7,389,345 | B1* | 6/2008 | Adams ................ H04L 41/0622 709/223 |
| 9,292,493 | B2 | 3/2016 | Chandramouli et al. |
| 10,079,721 | B2 | 9/2018 | Nair et al. |
| 10,771,323 | B2* | 9/2020 | Wang .................... H04L 41/065 |
| 2002/0111755 | A1* | 8/2002 | Valadarsky ........... H04L 41/065 702/58 |
| 2002/0152185 | A1 | 10/2002 | Satish Jamadagni |
| 2019/0094219 | A1* | 3/2019 | Sorek ................... G01N 33/564 |
| 2020/0099570 | A1* | 3/2020 | Chatterjee ............... H04L 41/06 |
| 2021/0075869 | A1* | 3/2021 | Li ......................... H04L 67/125 |

OTHER PUBLICATIONS

Disclosed Anonymously, "A System and Method to Prioritise Alerts in Anomaly Detection Systems", IP.com Prior Art Database Technical Disclosure, IPCOM000245766D, electronic publication date: Apr. 6, 2016, 4 pages.
Disclosed Anonymously, "Configuring Alarm Setting Using Machine Learning", IP.com Prior Art Database Technical Disclosure, IPCOM000252086D, Electronic publication Date: Dec. 15, 2017, 37 pages.

(Continued)

*Primary Examiner* — Rasheed Gidado
(74) *Attorney, Agent, or Firm* — Stephen R. Yoder

(57) ABSTRACT

A processor retrieves alarm data associated with an operation support system. A processor filters the alarm data. A processor groups the filtered alarm data. A processor extracts cross-domain node and port information for the grouped alarm data. A processor generates a cross-domain topology of the operation support system based on the extracted cross-domain node and port information.

17 Claims, 9 Drawing Sheets

(56) References Cited

OTHER PUBLICATIONS

Mazdziarz, A., "Alarm Correlation in Mobile Telecommunications Networks Based on K-Means Cluster Analysis Method", Journal of Telecommunications and Information Technology, Feb. 2018, 8 pages.
Meira, D.M., "A Model for Alarm Correlation in Telecommunications Networks", Thesis submitted to Department of Computer Science, Degree of Doctor of Science, Federal University of Minas Gerais, Belo Horizonte, Nov. 1997, 169 pages.
Wietgrefe, et al., "Using Neural Networks for Alarm Correlation in Cellular Phone Networks", In Proc. International Workshop on Applications of Neural Networks in Telecommunications, 1997, 10 pages, <http://citeseerx.ist.psu.edu/viewdoc/summary?doi=10.1.1.16.8090>.
Grace Period Disclosure: Yusuf Mirza, ""Sensing" Cross Domain Topology from Deep Machine Learning and Analytics", IBM White paper, Nov. 2018, 13 pages.

\* cited by examiner

| Time | Alarm | Node |
|---|---|---|
| 00:00:00 | remoteDefectIndication - 00-AF-45-Ethernet10GB-CTP | Ingress |
| 00:02:54 | interfaceDown - network@192.168.1.128 | Interface |
| 01:15:45 | inoperableEquipment - network@192.168.2.0 | Router |
| 02:28:36 | portLinkProblem - network@192.168.128.0 | Rack |
| 02:29:11 | ospfinterfaceDown - network@192.168.255.0 | Switch |

CROSS DOMAIN TOPOLOGY FROM MACHINE LEARNING

STATEMENT REGARDING PRIOR DISCLOSURES BY THE INVENTOR OR A JOINT INVENTOR (IF APPLICABLE)

The following disclosure(s) are submitted under 35 U.S.C. 102(b)(1)(A):
DISCLOSURE(S): "'Sensing' Cross Domain Topology from Deep Machine Learning and Analytics", Yusuf Mirza, November, 2018.

BACKGROUND OF THE INVENTION

The present invention relates generally to the field of operations support systems, and more particularly to modeling cross-domain handovers.

Operations Support Systems (OSS) are computer systems used by telecommunications service providers to manage their networks (e.g., telephone networks). OSSs support management functions such as network inventory, service provisioning, network configuration and fault management. Together with Business Support Systems (BSS), they are used to support various end-to-end telecommunication services. BSS and OSS have their own data and service responsibilities.

SUMMARY

Embodiments of the present invention provide a method, system, and program product to generate a cross-domain topology for an operation support system. A processor retrieves alarm data associated with an operation support system. A processor filters the alarm data. A processor groups the filtered alarm data. A processor extracts cross-domain node and port information for the grouped alarm data. A processor generates a cross-domain topology of the operation support system based on the extracted cross-domain node and port information.

DETAILED DESCRIPTION

Figure 1:
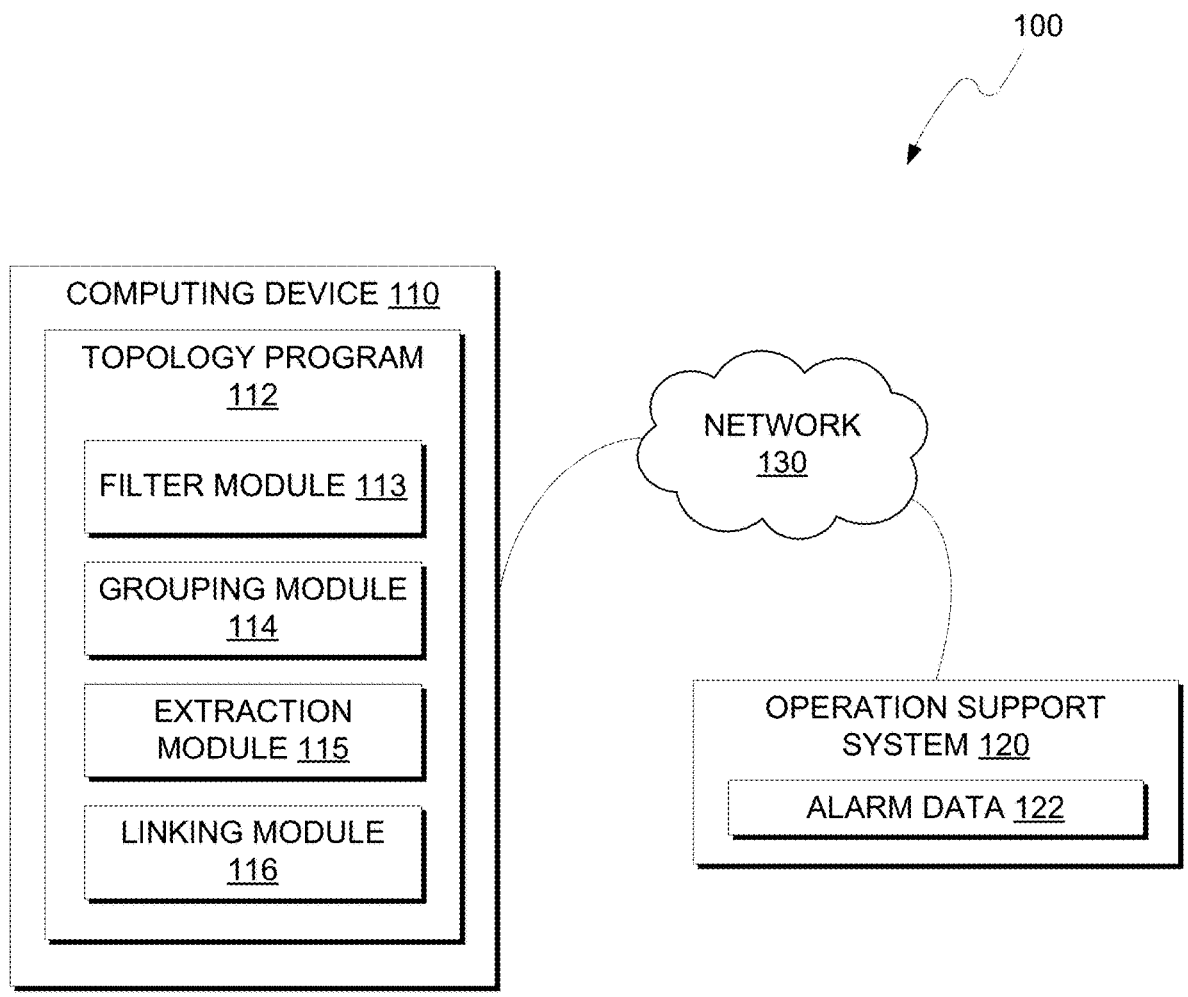
FIG. 1 is a functional block diagram illustrating a networked environment, in accordance with an exemplary embodiment of the present invention.

Many complex networks include cross-domain services or solutions that bridge or permit transfer of information between different domains of a network. Domains may be divided based on differing communication layers or mediums, which permit handovers that occur when information is transferred across the domains of each medium or layer. Prior solutions in cross-domain services do not offer any methodology or functionality to model or discover such handovers, instead relying on user-supplied descriptions or rules to map cross-domain interfaces. Embodiments of the present invention provide such functionality by deep learning analysis of alarm and other error data across multiple domains in a network. Based on extracted information from the analysis of alarm and other error data across multiple domains in a network, embodiments of the present invention provide an automatic detection and topological mapping of such cross-domain handovers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110 and operation support system (OSS) 120 connected over network 130. Computing device 110 includes topology program 112. Topology program 112 includes filter module 113 grouping module 114 extraction module 115 and linking module 116. OSS 120 includes alarm data 122.

In various embodiments of the present invention, computing device 110 can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to alarm data 122 and is capable of executing topology program 112. Computing device 110 may include internal and external hardware components, as depicted and described in further detail with respect to FIG. 8.

In this exemplary embodiment, topology program 112 is stored on computing device 110. However, in other embodiments, topology program 112 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and operation support system 120, in accordance with a desired embodiment of the present invention.

In various embodiments, topology program 112 retrieves alarm data 122 from OSS 120 for deep analysis and machine learning in order to generate a topology of cross-domain services of OSS 120. OSS 120 is an operational support system (OSS) that consists of a group of computer and network systems used by communications service providers for monitoring, controlling, analyzing and managing a computer, network, telephone or other communication system. OSS 120 includes various cross-domain services. An example OSS 120 with cross-domain services is provided in FIGS. 2A & 2B.

During operation, OSS 120 encounters one or more faults or alarms. OSS 120 stores the alarms as alarm data 122. Topology program 112 retrieves alarm data 122 from OSS 120. Alarm data 122 is a historic record of various alarms, errors, alerts and other indicative information of any faults or errors incurred by OSS 120. Filter module 113 of topology program 112 filters alarm data 122 to identify relevant alarms to cross-domain services. Example faults or alarms include, but are not limited to, Link Down, Port Down, Interface Down, Loss of Signal, Loss of Frame, Alarm Indication Signal (AIS), Remote Defect Indicator (RDI), Bidirectional Forwarding Detection (BFD) and the like.

Grouping module 114 of topology program 112 groups the filtered alarms based on a pre-determined set of criteria. Topology program 112 groups filtered alarm data 122 based on a grouping of alarms that occur across two domains and that also occur within a given time period from one another (e.g., alarms that occur within a few seconds or within a few minutes of one another). Once each grouping is determined, extraction module 115 extracts node and port information from each grouped alarm. Based on the extracted node and port information, linking module 116 generates a cross-domain topology which can be used by external systems, such as formal topology mapping and display solutions as well as inventory management system.

Figure 2A:
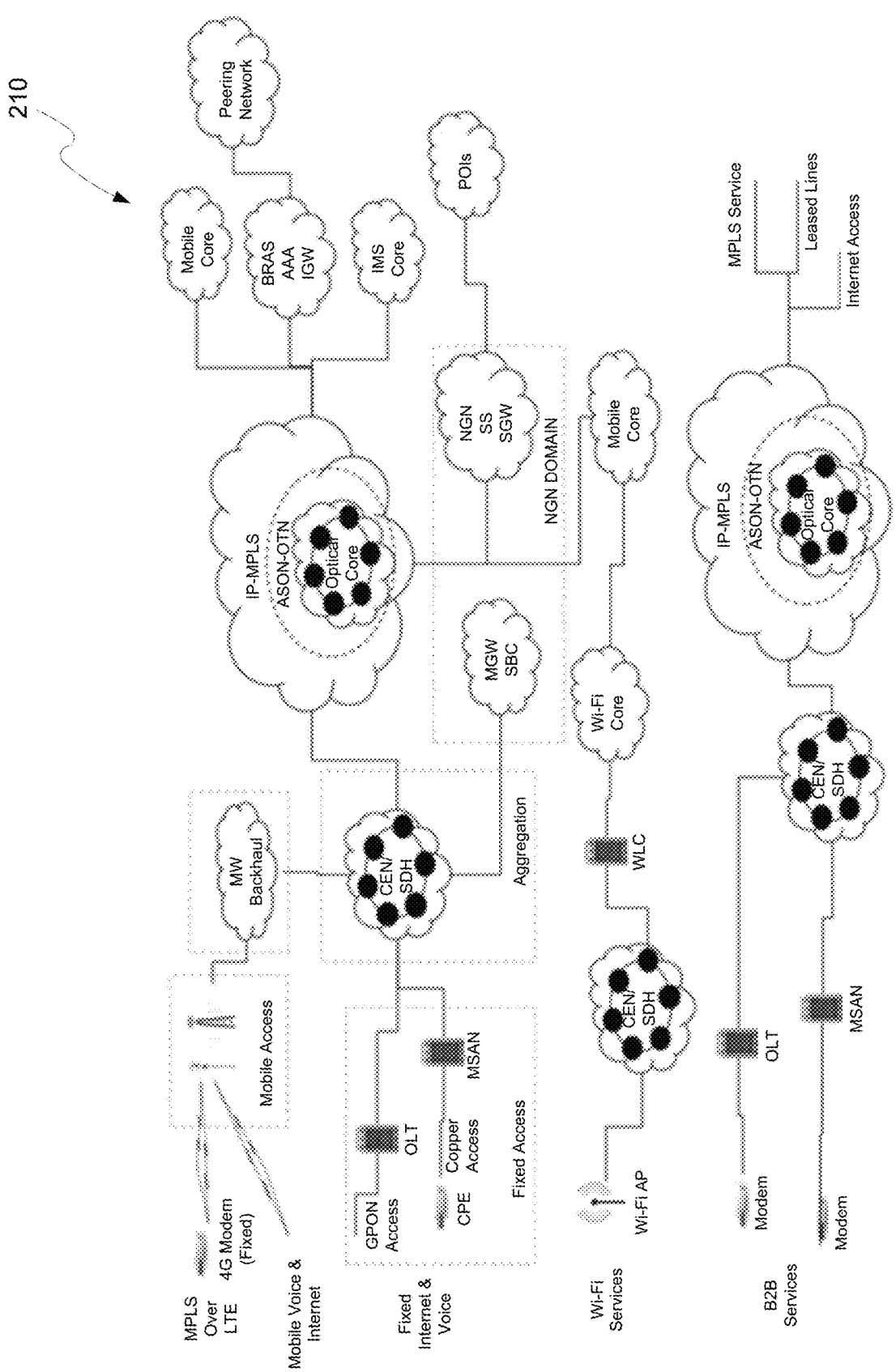
FIG. 2A depicts an example diagram of various technology domains managed by an operational support system.

FIG. 2A depicts OSS diagram 210. OSS diagram 210 depicts interconnected systems to deliver various network services such as Mobile Voice, Internet as well as Enterprise services such as MPLS VPN. Typically, each domain will be modeled into an inventory solution by discovery or by fulfillment process. Optical Core Inventory will contain information about all the SDH, DWDM, OTN nodes and its topology (Ring, Linear) and its protection types. Similarly, for IP networks, the inventory will contain the IP topology and links as per the network. However, the interconnect between these 2 domains will not be present in either of their respective solution unless cross-domain stitching based on business rules is applied.

Figure 2B:
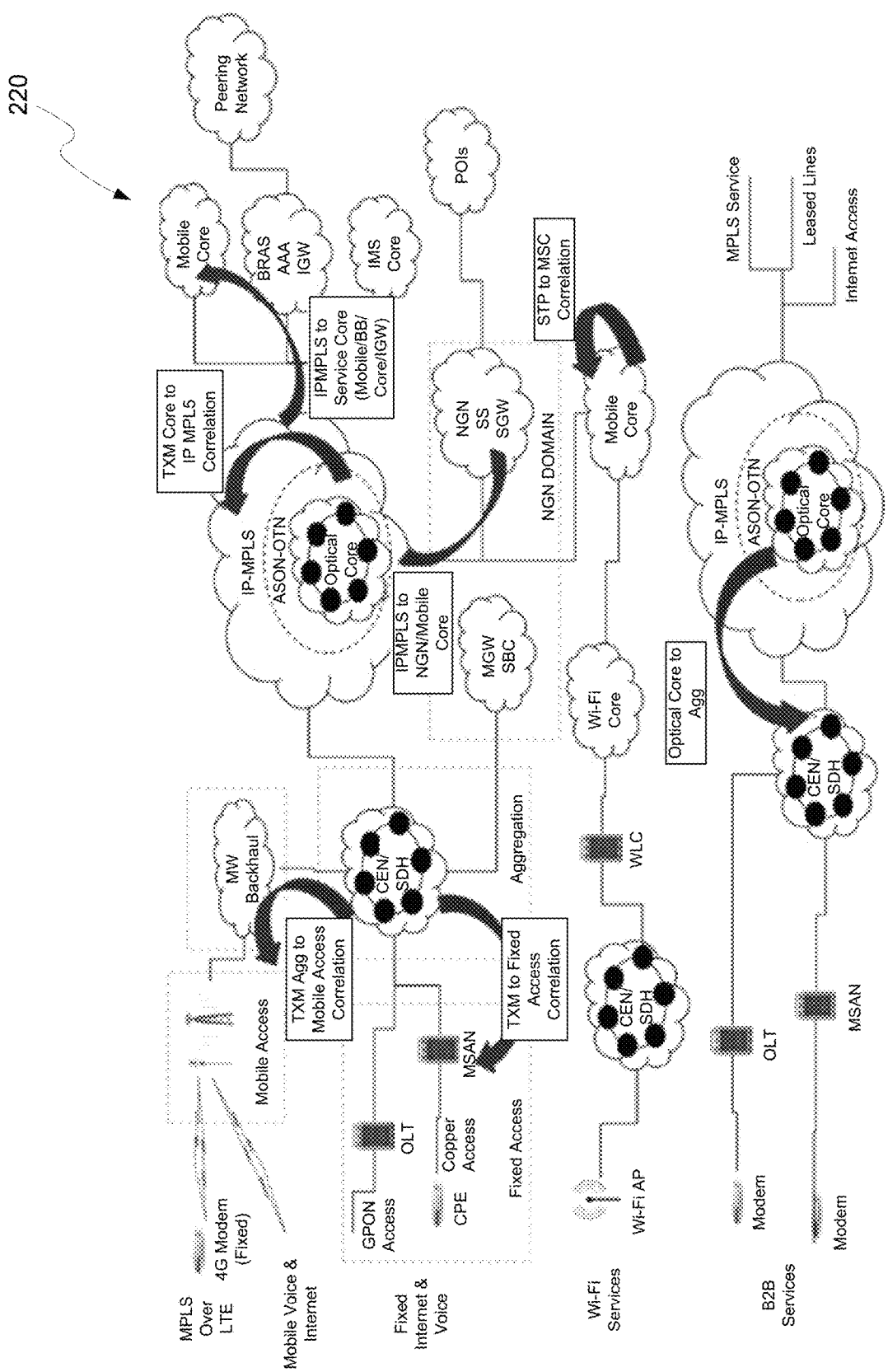
FIG. 2B depicts an example diagram of cross-domain handovers managed by an operational support system.

FIG. 2B depicts cross-domain network handovers in OSS diagram 220. Cross-domain OSS diagram 220 depicts various cross-domain handovers depicted as arrows indicating the key interconnects between domains. Typically to identify such interconnects in OSS 120, manual checks to find out the next domain interconnect point must be performed. Similarly, during the assurance process it becomes difficult to troubleshoot a service issue if the end to end topology is not known. This typically results in degraded operational performance, such as high Average Handling Time (AHT).

Therefore, there is a need for a solution that can provide an accurate view of the cross-domain topology links without relying on the interface descriptions or business rules. Embodiments of the present invention use deep machine learning (ML) and advanced analytics in the Fault Management domain to extract accurate cross-domain topology information.

Typical OSS systems maintain historic alarm databases with reports and alarms that can range typically, from 6 months to 5 years in age, such as alarm data 122. Topology program 112 extracts and filters alarm data 122 to learn how the alarm from a network resource relates to the alarms coming from different network resources, which can potentially belong to a different domain. If topology program 112 finds a pattern in alarm data 122, topology program 112 groups the alarms for later analysis. In various embodiments, topology program 112 identifies groups based on ML-based pattern analysis without any inventory or other reference feed provided by OSS 120. For example, the ML-based pattern analysis of topology program 112 is based on a Bayesian Classifier or Inference. Based on the observed probabilities of events in alarm data 122, topology program 112 determines the probability that two or more events across two domains coincide with one another. After training of the Bayesian Classifier ML-based pattern analysis, topology program 112 learns the types of events that indicate a likelihood two events coincide. Alarms that coincide across two domains may indicate crossover fault in OSS 120.

Grouped alarm data 122 may contain all alarms from the same domain or alarms from different domains per each grouping. By analyzing each group that contains alarms from different domains, topology program 112 identifies that the two nodes belong to different domains. In some scenarios, grouped alarm data 122 contain nodes from more than two domains such as between two of the following domain types: Fixed Access, IP Aggregation, or Transport. In such scenarios, the alert offset or time period used to group alarm data 122 may be increased or decreased to be considered in order to account for delays between domains.

For each groping, topology program 112 extracts any cross-domain groups detected. The extraction module 115 includes various machine learning algorithms to understand any unstructured data present in the alarm data 122 in order to extract meaningful information. For example, summary or journal fields in the alarm may contain information which provides details on the event, such as Channel Frequency for a Dense Wavelength Division Multiplexing (DWDM) issue which can be extracted from alarm data 122.

Figure 3:
FIG. 3 depicts an example alarm data set after filtering and grouping of alarms in an operational support system.

FIG. 3 depicts an example alarm data set 310. In the left pane of alarm data set 310, a grouping of alarm data 122 has occurred six times. Topology program 112 analyzes the group and identifies two nodes. The fifth row that is highlighted in alarm data set 310 belongs to IP Core domain and reported on Lag 32. In the first row, the alarm is from the Transport Domain. Based on the observance both alarms are always found to occur during the alarm grouping, topology program 112 determines that both are linked to each other across the domain, including the determined link in the resulting cross-domain topology map.

Figure 4:
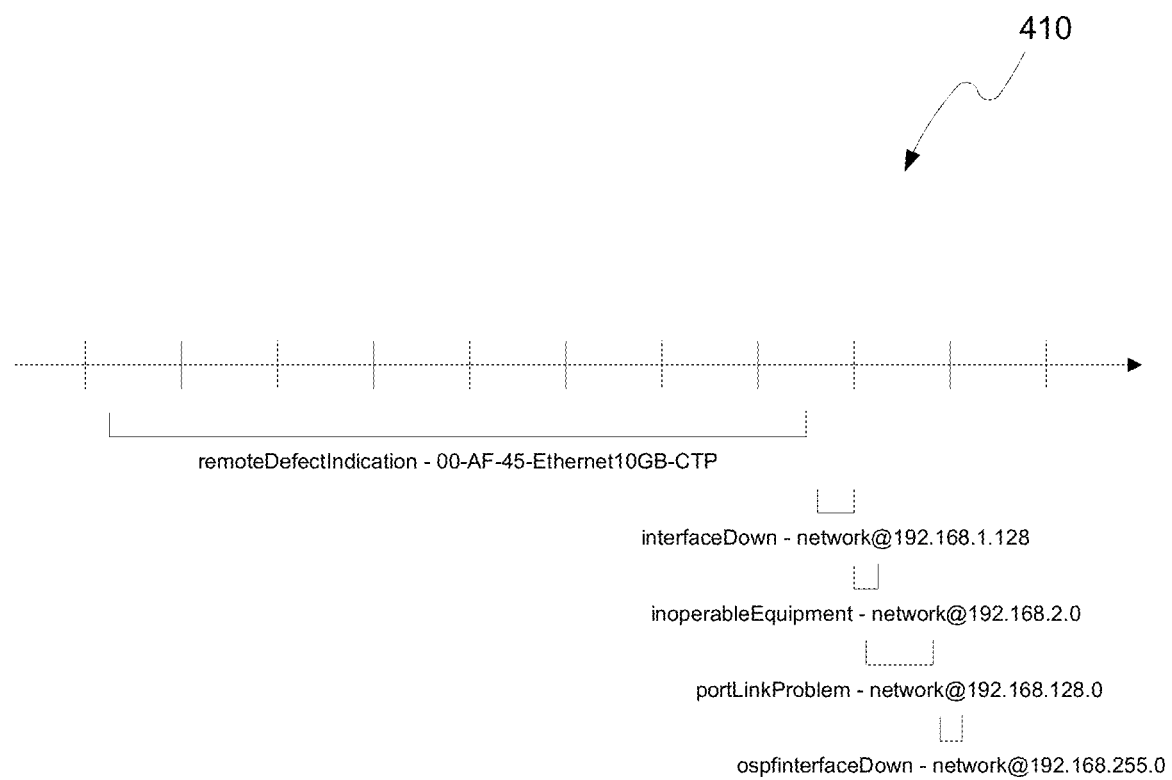
FIG. 4 depicts a timeline pattern of an example alarm data set.
Figure 5:
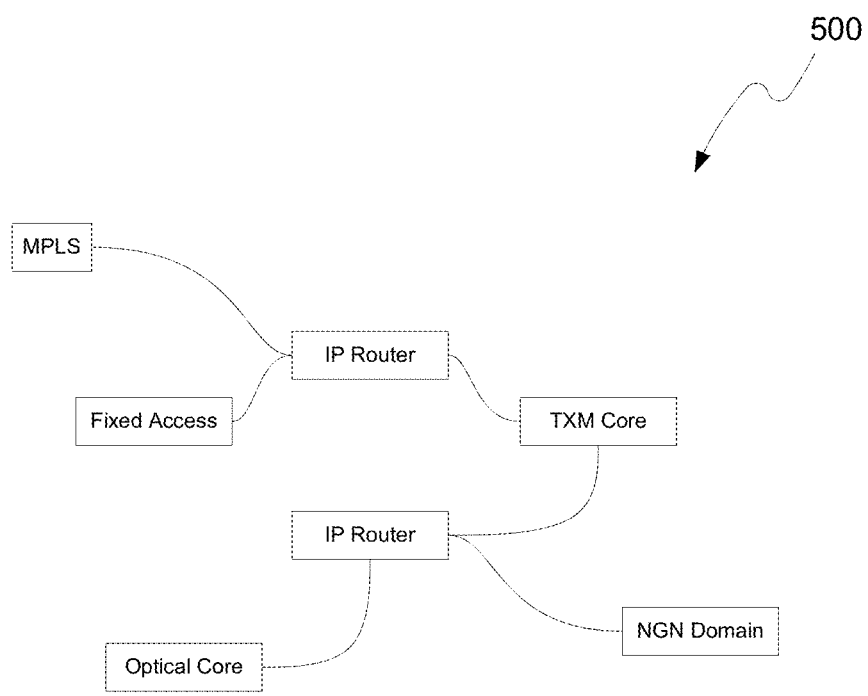
FIG. 5 depicts a cross-domain topology link of an operational support system.

FIG. 4 depicts a timeline pattern 410. Timeline pattern 410 includes various nodes that are related to each other as identified by grouping module 114. The example timeline pattern 410 group provides the information of the cross-domain topology Link form IP LAG to Transport node. In addition, timeline pattern 410 indicates other details such as area, vendor, capacity. If the information from all the cross-domain groups detected by grouping module 114 are analyzed, topology program 112 provides a list of topology links going across domains. Topology program 112 then generates a visualization of the topology and provides a topology view as shown in FIG. 5 as cross-domain topology 500.

Figure 6:
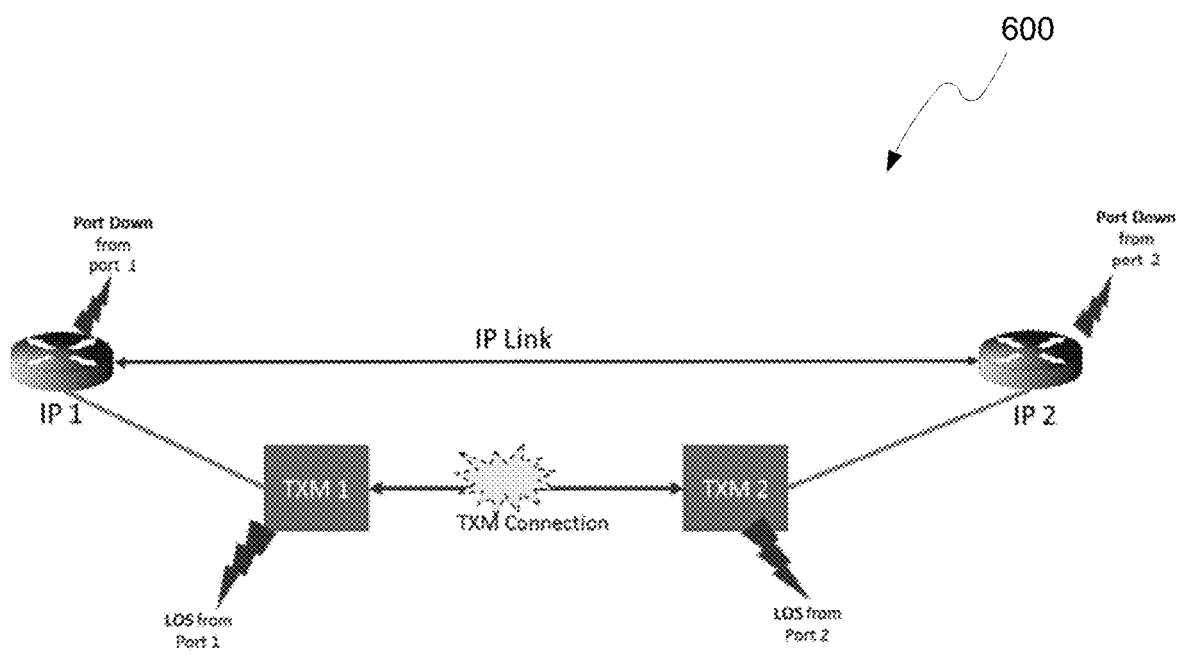
FIG. 6 depicts a cross-domain network diagram of an operational support system.

FIG. 6 depicts a cross-domain network diagram 600 of an operational support system. TXM 1 and TXM 2 both belong to an Optical Transmission Network. TXM 1 and TXM 2 are connected to each other via the "TXM Connection" link. IP1 and IP2 both belong to a Multiprotocol Label Switching (MLPLS) Network. IP1 and IP2 are connected to each other with "IP Link". "IP Link" is running 'as a logical service' upon the physical "TXM 1 to TXM 2 Link".

Topology program 112 detects the connectivity between IP1 and TXM 1 (and similarly IP2 and TXM 2) without the use of any available inventory source provided by OSS 120. Topology program 112 provides a solution to detect and determine connectivity using machine learning analytics on the network element faults presented in alarm data 122.

In this example, at some point in time an alarm is recorded in alarm data due to a fiber being severed on the TXM Connection generating two alarms stating: "LOS (loss of signal) from Port 1 on TXM 1" and "LOS (loss of signal) from Port 2 on TXM 2". After a few seconds, the IP domain subnet generates following alarms: "Port Down alarm from port 1 on IP 1" and "Port Down alarm from port 2 on IP 2". This is due to the OSS configuration described above where the IP link was running as a service on the TXM connection and is impacted due to the fiber cut.

Based on the above historical alarm data 122, topology program 112 determines that TXM 1 Port 1 alarm is always followed with IP 1 port 1 alarm and concludes that TXM 1 port 1 is connected to IP 1 port 1. Similarly, topology program 112 determines that TXM 2 Port 2 alarm is always followed with IP 2 port 2 alarm and concludes that TXM 2 port 2 is connected to IP 2 port 2. Thereby using the above historical alarm analytics, topology program 112 determines the following cross domain connections: 1) "IP 1 port 1" to "TXM 1 Port 1", and 2) "IP 2 port 2" to "TXM 2 Port 2". From the individual inventory sources, topology program 112 determines the intra-domain connectivity of: 1) "TXM 1 Port 1" to "TXM 2 Port 2" and 2) "IP 1 port 1" and "IP 2 port 2". By combining these two observations, topology program 112 determines the cross-domain network diagram 600.

Figure 7:
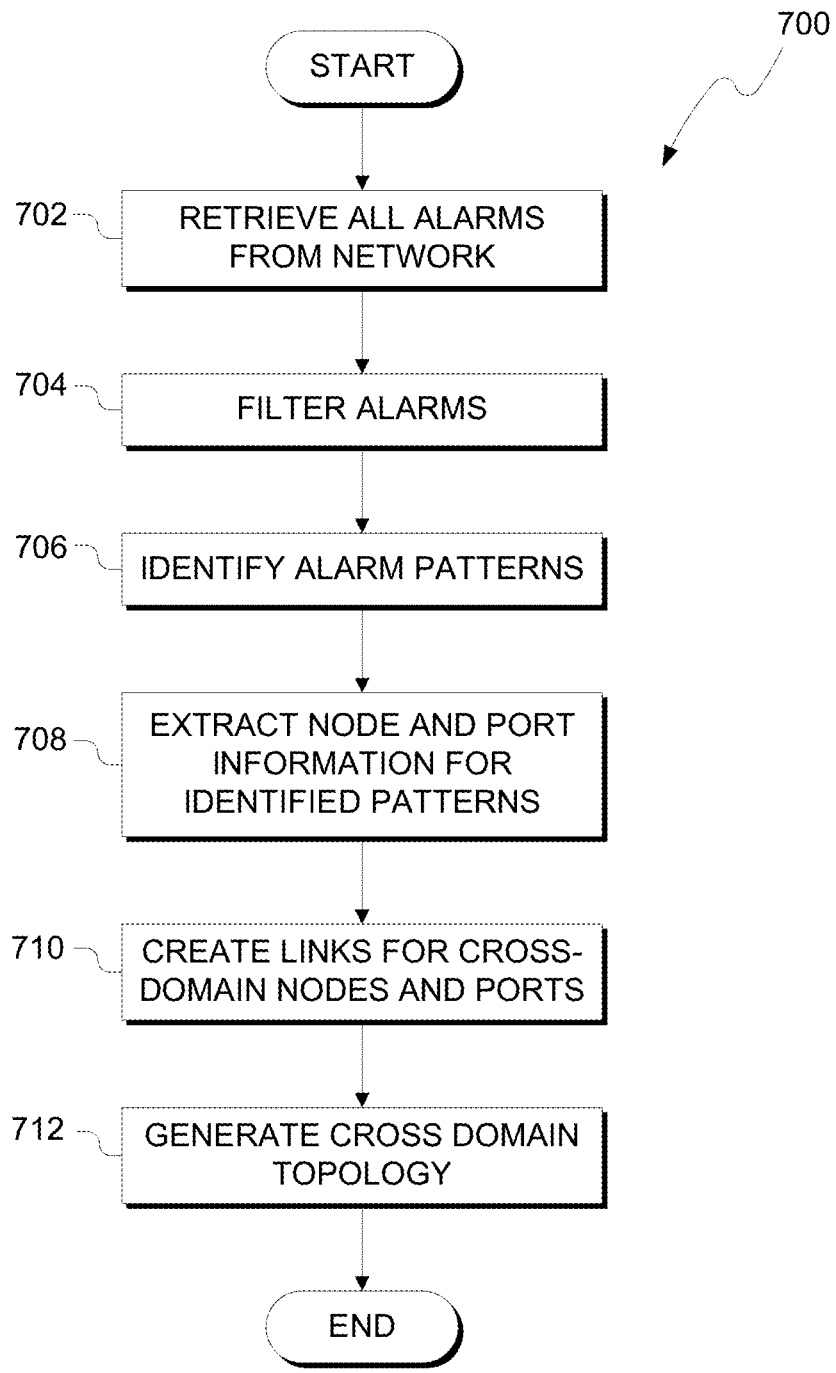
FIG. 7 illustrates operational processes of a topology program, on a computing device within the environment of FIG. 1, in accordance with an exemplary embodiment of the present invention.

FIG. 7 depicts a process flowchart, generally designated 700, of the operational processes of topology program 112. In process 702, topology program 112 retrieves alarm data 122 from OSS 120. During operation, OSS 120 records any alarms, faults or other errors as alarm data 122. In process 704, topology program 112 filters alarm data to include alarms that may indicate cross-domain fault or alarms including, but not limited to, Link Down, Port Down, Interface Down, Loss of Signal, Loss of Frame, Alarm Indication Signal (AIS), Remote Defect Indicator (RDI), Bidirectional Forwarding Detection (BFD) and other similar alarms.

In process 706, topology program 112 identifies patterns in the filtered alarm data 122. For alarms that both 1) occur within predetermined time frame (e.g., a few minutes) and 2) contain alarms from two separate domains in OSS 120, topology program 112 groups the alarms. For each grouping, topology program 112 extracts node and port information from the group (process 708). Based on the extracted node and port information, topology program 112 creates one or more topology links between the two or more domains in each grouping (process 710). In process 712, based on each link identified in process 710, topology program 112 generates a cross-domain topology of OSS 120.

Figure 8:
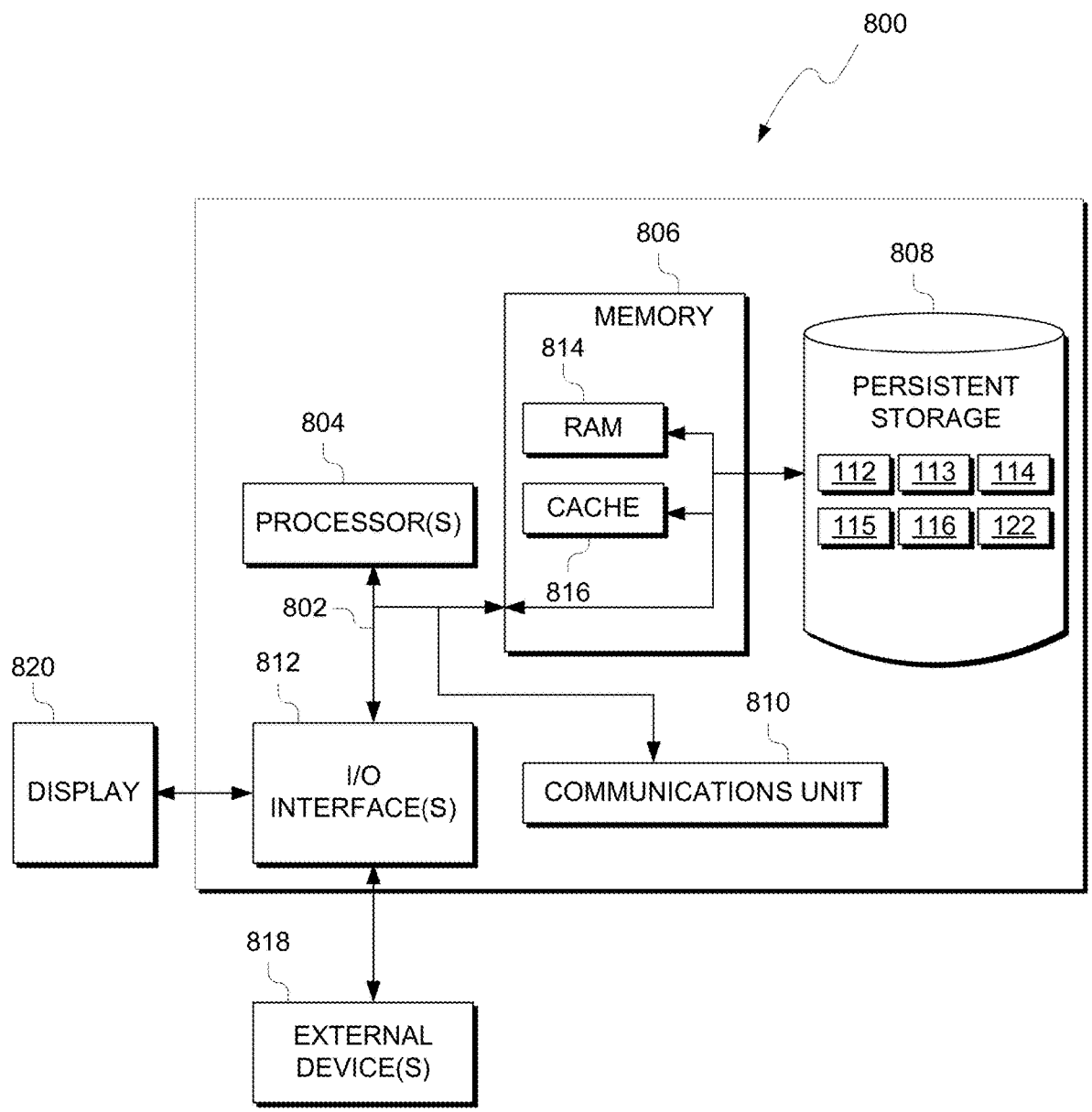
FIG. 8 depicts a block diagram of components of the computing device executing a topology program, in accordance with an exemplary embodiment of the present invention.

FIG. 8 depicts a block diagram, 800, of components of computing device 110, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computing device 110 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Topology program 112 is stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 130. In these examples, communications unit 810 includes one or more network interface cards. Communications unit 810 may provide communications through the use of either or both physical and wireless communications links. Topology program 112 may be downloaded to persistent storage 808 through communications unit 810.

I/O interface(s) 812 allows for input and output of data with other devices that may be connected to computing device 110. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., topology program 112, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    retrieving, by one or more processors, alarm data associated with an operation support system;
    filtering, by the one or more processors, the alarm data;
    grouping, by the one or more processors, the filtered alarm data;
    extracting, by the one or more processors, cross-domain node and port information for the grouped alarm data; and
    generating, by the one or more processors, a cross-domain topology of the operation support system based on the extracted cross-domain node and port information, wherein the cross-domain topology is generated without inventory information regarding the operation support system.

2. The method of claim 1, wherein the filtered alarm data includes alarms from one or more of the following: Link Down, Port Down, Interface Down, Loss of Signal, Loss of Frame, Alarm Indication Signal (AIS), Remote Defect Indicator (RDI), or Bidirectional Forwarding Detection (BFD).

3. The method of claim 1, wherein the grouped alarm data includes alarms that occurred within a pre-determined time frame.

4. The method of claim 1, wherein the grouped alarm data includes alarms that occurred in more than one domain of the operation support system.

5. The method of claim 1, wherein grouping the filtered data is further based on pattern analysis.

6. The method of claim 5, wherein the pattern analysis is based on a Bayesian Classifier model.

7. A computer program product comprising:
one or more computer-readable storage media and program instructions stored on the one or more computer-readable storage media, the program instructions comprising:
program instructions to retrieve alarm data associated with an operation support system;
program instructions to filter the alarm data;
program instructions to group the filtered alarm data;
program instructions to extract cross-domain node and port information for the grouped alarm data; and
program instructions to generate a cross-domain topology of the operation support system based on the extracted cross-domain node and port information, wherein the cross-domain topology is generated without inventory information regarding the operation support system.

8. The computer program product of claim 7, wherein the filtered alarm data includes alarms from one or more of the following: Link Down, Port Down, Interface Down, Loss of Signal, Loss of Frame, Alarm Indication Signal (AIS), Remote Defect Indicator (RDI), or Bidirectional Forwarding Detection (BFD).

9. The computer program product of claim 7, wherein the grouped alarm data includes alarms that occurred within a pre-determined time frame.

10. The computer program product of claim 7, wherein the grouped alarm data includes alarms that occurred in more than one domain of the operation support system.

11. The computer program product of claim 7, wherein grouping the filtered data is further based on pattern analysis.

12. The computer program product of claim 11, wherein the pattern analysis is based on a Bayesian Classifier model.

13. A computer system comprising:
one or more computer processors;
one or more computer readable storage media; and
program instructions stored on the computer readable storage media for execution by at least one of the one or more processors, the program instructions comprising:
program instructions to retrieve alarm data associated with an operation support system;
program instructions to filter the alarm data;
program instructions to group the filtered alarm data;
program instructions to extract cross-domain node and port information for the grouped alarm data; and
program instructions to generate a cross-domain topology of the operation support system based on the extracted cross-domain node and port information, wherein the cross-domain topology is generated without inventory information regarding the operation support system.

14. The computer system of claim 13, wherein the filtered alarm data includes alarms from one or more of the following: Link Down, Port Down, Interface Down, Loss of Signal, Loss of Frame, Alarm Indication Signal (AIS), Remote Defect Indicator (RDI), or Bidirectional Forwarding Detection (BFD).

15. The computer system of claim 13, wherein the grouped alarm data includes alarms that occurred within a pre-determined time frame.

16. The computer system of claim 13, wherein the grouped alarm data includes alarms that occurred in more than one domain of the operation support system.

17. The computer system of claim 13, wherein grouping the filtered data is further based on pattern analysis.

* * * * *